(12) United States Patent
Leffert et al.

(10) Patent No.: US 8,160,991 B2
(45) Date of Patent: Apr. 17, 2012

(54) AUTOMATED ESTIMATION OF A COUNTRY WHERE A CLIENT COMPUTER IS CONFIGURED TO OPERATE

(75) Inventors: Jonathan B. Leffert, Santa Clara, CA (US); Patrice Gautier, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/179,478

(22) Filed: Jul. 8, 2011

(65) Prior Publication Data

US 2012/0016927 A1    Jan. 19, 2012

Related U.S. Application Data

(63) Continuation of application No. 11/016,673, filed on Dec. 16, 2004, now Pat. No. 7,996,351.

(51) Int. Cl.
*G06F 17/00* (2006.01)
*G06N 5/02* (2006.01)

(52) U.S. Cl. .......................................... 706/47

(58) Field of Classification Search ........................ None
See application file for complete search history.

(56) References Cited

U.S. PATENT DOCUMENTS

| | | | |
|---|---|---|---|
| 5,321,639 A | 6/1994 | Krishnamoorthy et al. | |
| 5,710,887 A | 1/1998 | Chelliah et al. | |
| 6,151,631 A | 11/2000 | Ansell et al. | |
| 6,205,433 B1 | 3/2001 | Boesch et al. | |
| 6,311,190 B1 | 10/2001 | Bayer et al. | |
| 6,327,535 B1 | 12/2001 | Evans et al. | |
| 6,460,020 B1 | 10/2002 | Pool et al. | |
| 6,611,811 B1 | 8/2003 | Deaton et al. | |
| 6,623,529 B1 | 9/2003 | Lakritz | |
| 6,665,715 B1 | 12/2003 | Houri | |
| 6,757,740 B1 | 6/2004 | Parekh et al. | |
| 6,826,617 B1 | 11/2004 | Ansell et al. | |
| 7,424,543 B2 | 9/2008 | Rice, III | |
| 7,996,351 B1 | 8/2011 | Leffert et al. | |
| 2001/0051959 A1 | 12/2001 | Penn et al. | |
| 2002/0007309 A1 | 1/2002 | Reynar | |
| 2002/0138588 A1 | 9/2002 | Leeds | |
| 2002/0147790 A1 | 10/2002 | Snow | |
| 2002/0174010 A1 | 11/2002 | Rice, III | |
| 2002/0174421 A1 | 11/2002 | Zhao et al. | |
| 2002/0199182 A1 | 12/2002 | Whitehead | |
| 2003/0007188 A1 | 1/2003 | Hoshino et al. | |

(Continued)

OTHER PUBLICATIONS

U.S. Appl. No. 11/015,189, filed Dec. 16, 2004, Leffert, Jonathan B.

(Continued)

*Primary Examiner* — Kakali Chaki
*Assistant Examiner* — Peter Coughlan
(74) *Attorney, Agent, or Firm* — Adeli & Tollen LLP

(57) ABSTRACT

A method for automatically estimating a country where a client computer is configured to operate. The method gathers information of the client computer (e.g., GMT offset, time zone name, daylight savings status, desktop language, etc.) and estimates a country where the client computer is configured to operate using the gathered information and country estimation programming. The method may send information regarding the identity of the estimated country to a server and then receive information from the server based on the estimated country. In other embodiments, the gathered information is sent to the server and the server estimates the country where the client computer is configured to operate. In some embodiments, the country estimation programming comprises a rule engine implemented by rule programming. In some embodiments, the rule engine comprises a recursive rule program.

20 Claims, 11 Drawing Sheets

U.S. PATENT DOCUMENTS

| | | |
|---|---|---|
| 2003/0023712 A1 | 1/2003 | Zhao et al. |
| 2003/0065571 A1 | 4/2003 | Dutta |
| 2003/0074471 A1 | 4/2003 | Anderson et al. |
| 2003/0110130 A1 | 6/2003 | Pelletier |
| 2003/0115258 A1 | 6/2003 | Baumeister et al. |
| 2003/0144850 A1 | 7/2003 | Franks et al. |
| 2004/0019530 A1 | 1/2004 | Broussard et al. |
| 2004/0030490 A1 | 2/2004 | Hegedus et al. |
| 2004/0122656 A1 | 6/2004 | Abir |
| 2004/0139003 A1 | 7/2004 | Udiani |
| 2004/0168122 A1 | 8/2004 | Kobipalayam Murugaiyan |
| 2004/0172331 A1 | 9/2004 | Merriman et al. |
| 2004/0199623 A1 | 10/2004 | Houri |
| 2004/0215693 A1 | 10/2004 | Thompson |
| 2004/0220884 A1 | 11/2004 | Khan |
| 2004/0243471 A1 | 12/2004 | Salmen et al. |

OTHER PUBLICATIONS

Portions of prosecution history of U.S. Appl. No. 11/016,673, filed Jul. 7, 2011, Leffert, Jonathan B., et al.

Portions of prosecution history of U.S. Appl. No. 11/015,189, filed Sep. 9, 2011, Leffert, Jonathan B.

Kotler, Philip, et al., "Principles of Marketing Eighth Edition", Month Unknown, 1999, pp. 577-603, Chapter 19, Prentice-Hall, Inc., Upper Saddle River, NJ, USA.

AUTOMATED ESTIMATION OF A COUNTRY WHERE A CLIENT COMPUTER IS CONFIGURED TO OPERATE

CLAIM OF BENEFIT TO PRIOR APPLICATIONS

This application is a continuation application of U.S. patent application Ser. No. 11/016,673, now issued as U.S. Pat. No. 7,996,351, entitled "AUTOMATED ESTIMATION OF A COUNTRY WHERE A CLIENT COMPUTER IS CONFIGURED TO OPERATE," filed Dec. 16, 2004 now U.S. Pat. No. 7,996,351. U.S. patent application Ser. No. 11/016,673, now issued as U.S. Pat. No. 7,996,351 is incorporated herein by reference.

FIELD OF THE INVENTION

The present invention is directed towards automated estimation of a country where a client computer is configured to operate.

BACKGROUND OF THE INVENTION

Product purchases made through the Internet (e.g., via the World Wide Web) have increased rapidly with the growing popularity of the Internet. On-line retail ordering allows users/buyers to conveniently place orders for products from a client computer. For example, users can order products from a seller's Web site by submitting a purchase order to the seller's server which receives and processes the purchase order.

The Internet also allows users/buyers from around the world to place orders to the seller's server regardless of where the server is located. Often sellers provide different product sets depending on the country where the user/buyer is located. As such, sellers typically send different product information (for the different product sets) to the user's client computer depending on the country where the user is located. This product information typically comprises a listing of the products (i.e., product set) available in the particular country of the user and the price of each product in the product set in the currency type of the country of the user.

Conventional methods for determining the country of the user require the user to enter and submit information identifying the country of the user. Conventional methods for determining the country of the user, however, do not offer a seamless interactive experience with the server. As such, there is a need for a method for determining or estimating the country of the user/client computer without requiring the user to enter and submit such information.

SUMMARY OF THE INVENTION

A method for automatically estimating a country where a client computer is configured to operate is provided. The method gathers configuration information/settings of the client computer (e.g., Greenwich Mean Time (GMT) offset, time zone name, daylight savings status, desktop language, etc.) and estimates a country where the client computer is configured to operate using the gathered configuration information and country estimation programming. In some embodiments, the method sends information/data regarding the identity of the estimated country to a server and receives information/data from the server based on the estimated country. In other embodiments, the method receives information/data from the server and then identifies a sub-set of the received information/data based on the estimated country. In further embodiments, the gathered configuration information is sent to the server and the server estimates the country where the client computer is configured to operate using country estimation programming.

In some embodiments, the country estimation programming comprises a rule engine implemented by rule programming, the rule engine comprising one or more sets of rules and a processing relationship between the sets of rules and the rules in each set of rules. In some embodiments, the rule engine comprises a recursive rule program.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

A method for automatically estimating a country where a client computer is configured to operate is provided. The method gathers configuration information/settings of the client computer (e.g., Greenwich Mean Time (GMT) offset, time zone name, daylight savings status, desktop language, etc.) and estimates a country where the client computer is configured to operate using the gathered configuration information and country estimation programming. In some embodiments, the method sends information/data regarding the identity of the estimated country to a server and receives information/data from the server based on the estimated country. In other embodiments, the method receives information/data from the server and then identifies a sub-set of the received information/data based on the estimated country. In further embodiments, the gathered configuration information is sent to the server and the server estimates the country where the client computer is configured to operate using country estimation programming.

In some embodiments, the country estimation programming comprises a rule engine implemented by rule programming, the rule engine comprising one or more sets of rules and a processing relationship between the sets of rules and the rules in each set of rules. In some embodiments, the rule engine comprises a recursive rule program.

Several embodiments are described below in relation to a multimedia application through which a client computer can receive information regarding photo products from a server connected with the client computer. One of ordinary skill in the art, however, will realize that the processes of the invention can relate to any application executing on a client computer that interfaces with a server.

Network Environment

Figure 1:
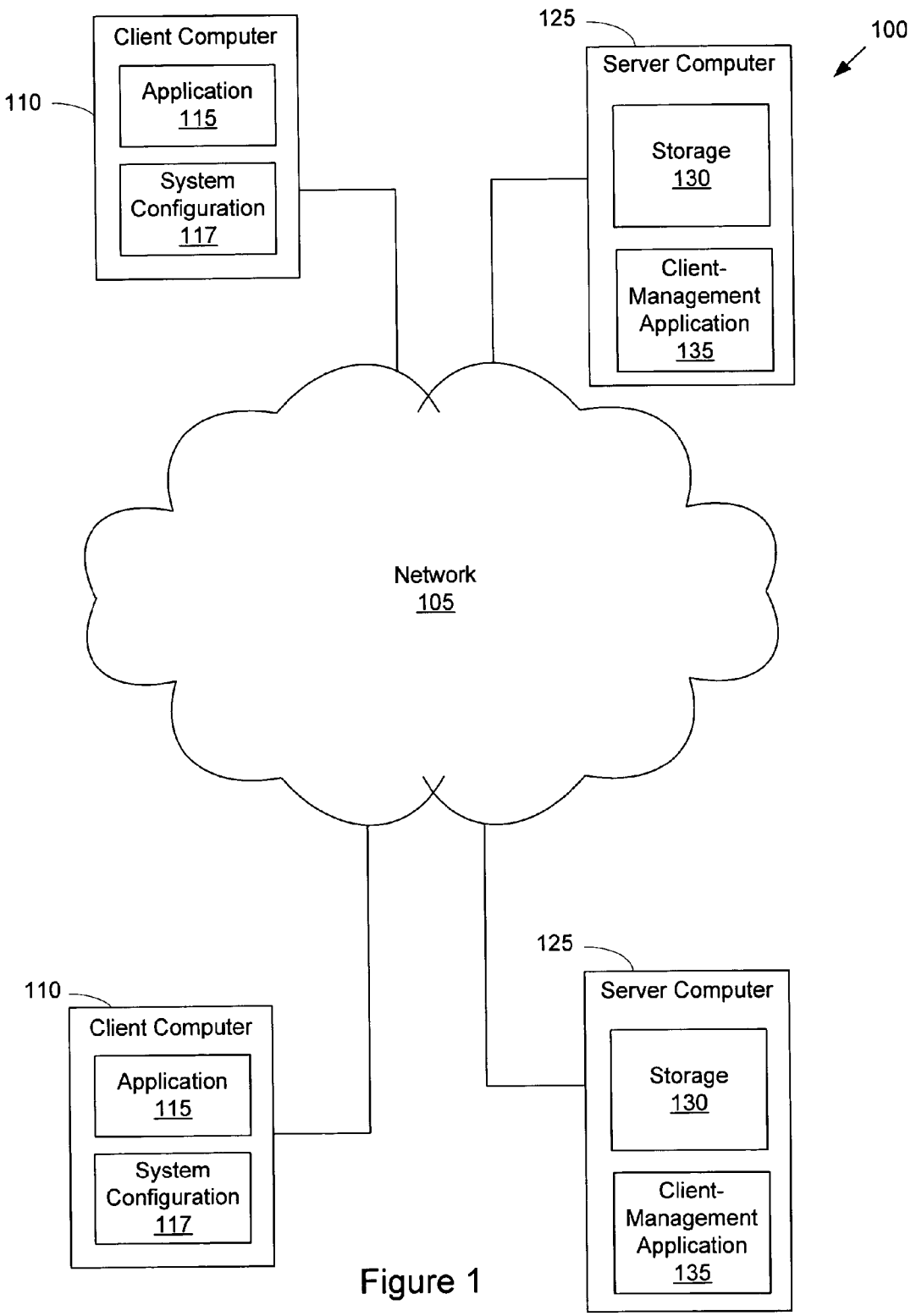
FIG. 1 illustrates a conceptual diagram of a network environment in which the present invention operates.

FIG. 1 illustrates a conceptual diagram of a network environment 100 in which the present invention operates. The environment 100 includes a network 105 (such as a LAN, WAN, the Internet, an Intranet, etc.) connecting a plurality of client computers 110 and a plurality of server computers 125.

A client computer 110 may be any form of device that is configured to interface with a network 105 and to send and receive data to and from a server 125. Examples of client computers 110 are desktop computers, laptop computers, server computers, portable computing devices (such as personal data assistants or cellular phones), etc.

The client computer 110 comprises a system configuration 117 that specifies configuration settings for the client computer 110. These configuration settings include information/settings that help indicate in which country the client computer 110 is configured to operate, such information/settings being referred to herein as country configuration information/settings of the client computer 110. In some embodiments, country configuration information/settings include Greenwich Mean Time (GMT) offset, time zone name, daylight savings status, and/or desktop language. Daylight savings status can be specified as "Yes"/"Daylight" (indicating that daylight savings is active and it is presently summer) or specified as "No"/"Standard" (indicating that daylight savings is not active and it is presently winter).

The client computer 110 typically executes an application 115 that interfaces with the network 105 and interacts with a server 125 to send and retrieve data to and from the server 125. In some embodiments, the application 115 is configured/programmed to perform the methods of the present invention. Examples of applications 115 include web browsers, multimedia applications, etc. As an example, the client computer 110 may execute a multimedia application for editing, managing, and publishing photos and ordering photo prints or other products from a server, the application having a custom interface with the server for exchanging data. An example of such a multimedia application is described in U.S. patent application Ser. No. 10/042,944, filed Jan. 6, 2002, entitled "Method and Apparatus for Image Acquisition, Organization, Manipulation, and Publication," now issued as U.S. Pat. No. 6,850,247, which is incorporated herein by reference.

In some embodiments, the application 115 and client computer 110 is used by a user to interact with a server 125 to receive information (e.g., product information for a product set) from the server and to display the received information to the user. In some embodiments, the application 115 also comprises country estimation programming for estimating the country where the client computer 110 is configured to operate, the estimated country being referred to herein as the country associated with the client computer 110. In some embodiments, the application 115 is configured/programmed to gather configuration information/data (e.g., GMT offset, time zone name, daylight savings status, desktop language, etc.) regarding the client computer 110, estimate a country where the client computer is configured to operate using the gathered configuration information and the country estimation programming, send information/data regarding the identity of the estimated country to the server 125, and receive information/data (e.g., product information) from the server 125 based on the estimated country.

The server computer 125 may be accessed by multiple client computers 110 that request and receive data and/or executable programming instructions from the server. The server 125 may execute a client-management application 135 that receives requests from client computers, retrieves requested data and/or programming instructions from the storage structure 130, and sends the data and/or programming instructions to the client computers 110. In some embodiments, the storage 130 of the server contains country estimation programming instructions. In some embodiments, the storage 130 of the server 125 contains different sets of information for different countries (e.g., different product information for different product sets available in different countries). In some embodiments, the server 125 receives information/data identifying an estimated country for a client computer, retrieves information/data based on the estimated country, and sends the retrieved information/data to the client computer.

In some embodiments, the product information (stored in the storage 130 of the server 125) for a product set available in a particular country comprises a listing and description of the products in the product set and the price of each product in the product set in the currency type of the particular country. Available product sets typically vary from country to country. For example, a product set comprising a plurality of different sized photo prints may vary in terms of size depending on country. For example, a product set available for a first country may comprise a "3 inch×5 inch" print, a "5 inch×7 inch" print, and a "8 inch×10 inch" print, whereas a product set available for a second country may comprise a "6 cm×10 cm" print, a "10 cm×15 inch" print, and a "18 cm×25 cm" print. If a product set is made available to users of a particular country, the country is referred to as a "supported" country. Typically, only some countries are supported by the server where others are not supported.

Client-Side Estimation of the Country Associated with the Client Computer

Figure 2:
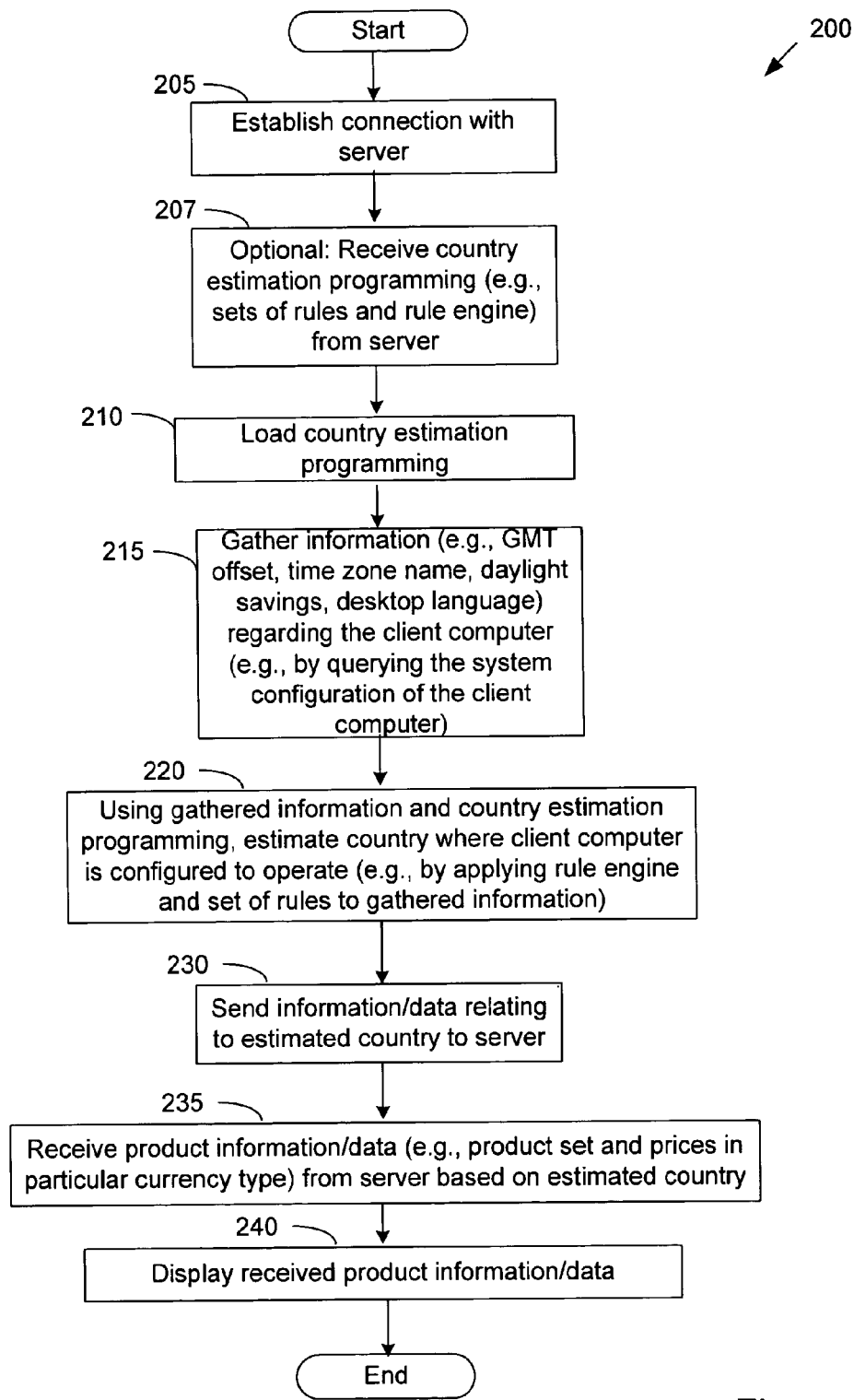
FIG. 2 is a flowchart for a client-side method for automatically estimating the country where a client computer is configured to operate, the estimation being made by the client computer itself.

FIG. 2 is a flowchart for a client-side method 200 for automatically estimating (without human intervention) the country where a client computer is configured to operate, the estimation being made by the client computer itself. The client-side method 200 may be implemented, for example, by a client computer and an application executing on the client computer. In some embodiments, the application (e.g., web browser, multimedia application, etc.) is configured/programmed to perform the methods of the present invention.

The method 200 begins when it establishes (at 205) a connection (e.g., via a network) with a server. As an optional step, the method receives (at 207) country estimation programming instructions (for estimating the country where the client computer is configured to operate) from the server. In some embodiments, the country estimation programming is received (at 207) from the server, whereas in other embodiments, the country estimation programming is already contained in the application executing on the client computer. Upon establishing (at 205) the connection with the server, the method then loads (at 210) the country estimation programming instructions.

The method then gathers (at 215) configuration information relating to the client computer such as one or more country configuration settings (e.g., GMT offset, time zone name, daylight savings status, desktop language, etc.) of the client computer. This step may be performed, for example, by querying the system configuration of the client computer for the one or more country configuration settings. Using the gathered configuration information and the country estimation programming instructions, the method then estimates (at 220) the country where the client computer is configured to operate.

The method then sends (at 230) information/data identifying the estimated country to the server. In response, the method receives (at 235) information/data from the server based on the estimated country. For example, the received information/data may comprise product information for a product set made available in the estimated country by the server, the product information including the price of products in the product set in the particular currency type of the estimated country. The method displays (at 240) the received information/data and ends.

In some embodiments, the country estimation programming instructions comprises a rule engine implemented by rule programming, the rule engine comprising one or more sets of rules and a processing relationship between the sets of rules and the rules in each set of rules. In some embodiments, the rule engine comprises a recursive rule program implemented by rule programming. In some embodiments, the method estimates (at 220) the country of the client computer by applying the rule engine to the gathered configuration information. These embodiments are described below in relation to FIGS. 5, 6, 7, and 8.

Figure 3:
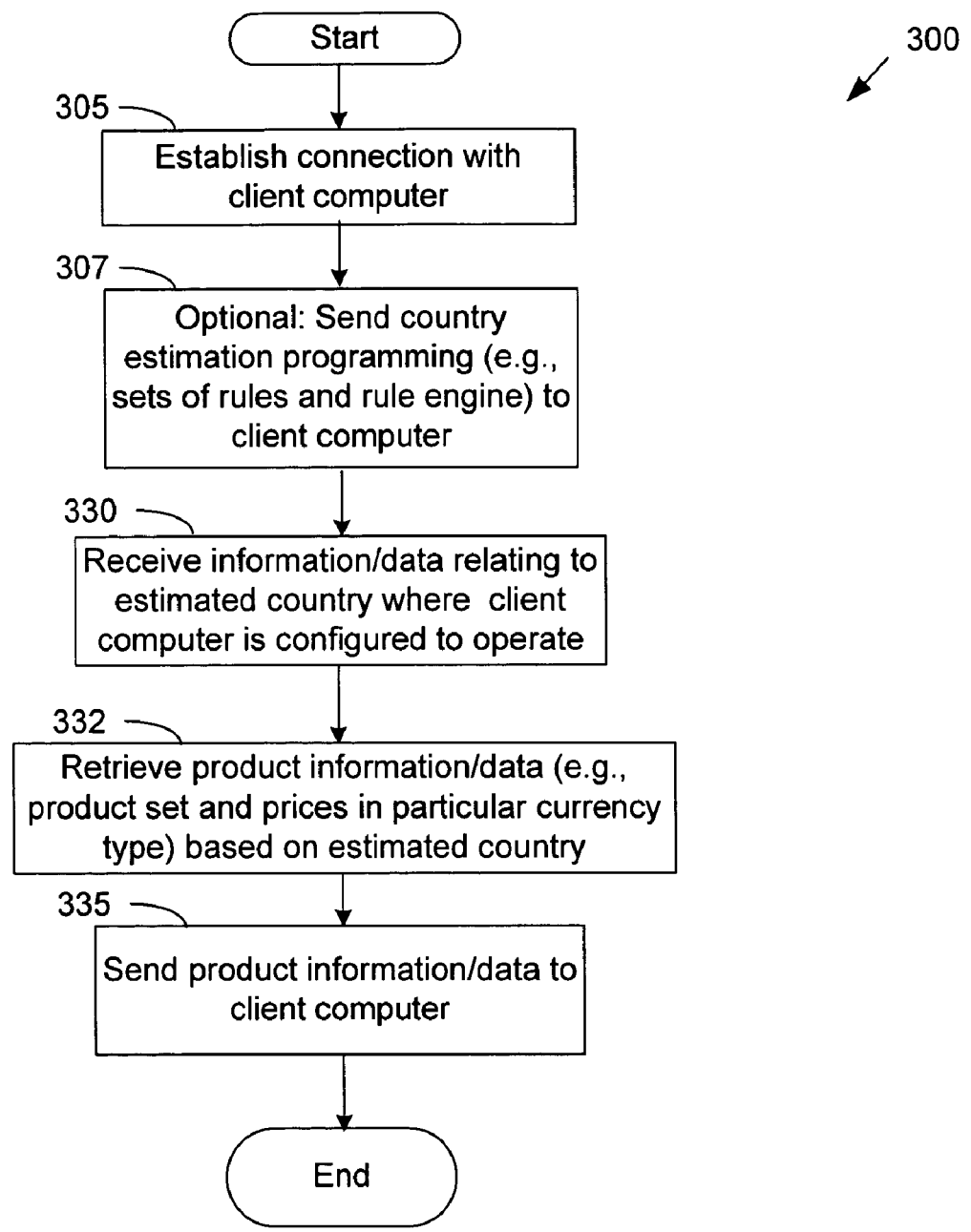
FIG. 3 is a flowchart for a server-side method for automatically estimating the country where a client computer is configured to operate, the estimation being made by the client computer itself.

FIG. 3 is a flowchart for a server-side method 300 for automatically estimating (without human intervention) the country where a client computer is configured to operate, the estimation being made by the client computer itself. The server-side method 300 may be implemented, for example, by a server computer connected with the client computer and a client-management application executing on the server computer. In some embodiments, the client-management application is configured to perform the methods of the present invention.

The method 300 begins when it establishes (at 305) a connection (e.g., via a network) with a client computer. As an optional step, the method sends (at 307) country estimation programming instructions (for estimating the country where the client computer is configured to operate) to the client computer. The method then receives (at 330) information/data identifying the estimated country from the client computer. In response, the method retrieves (at 332) information/data based on the estimated country (e.g., from a storage of the server). For example, the retrieved information/data may comprise product information for a product set available in the estimated country, the product information including the price of the products in the particular currency type of the estimated country. The method then sends (at 335) the retrieved information/data to the client computer. The method then ends.

Figure 4:
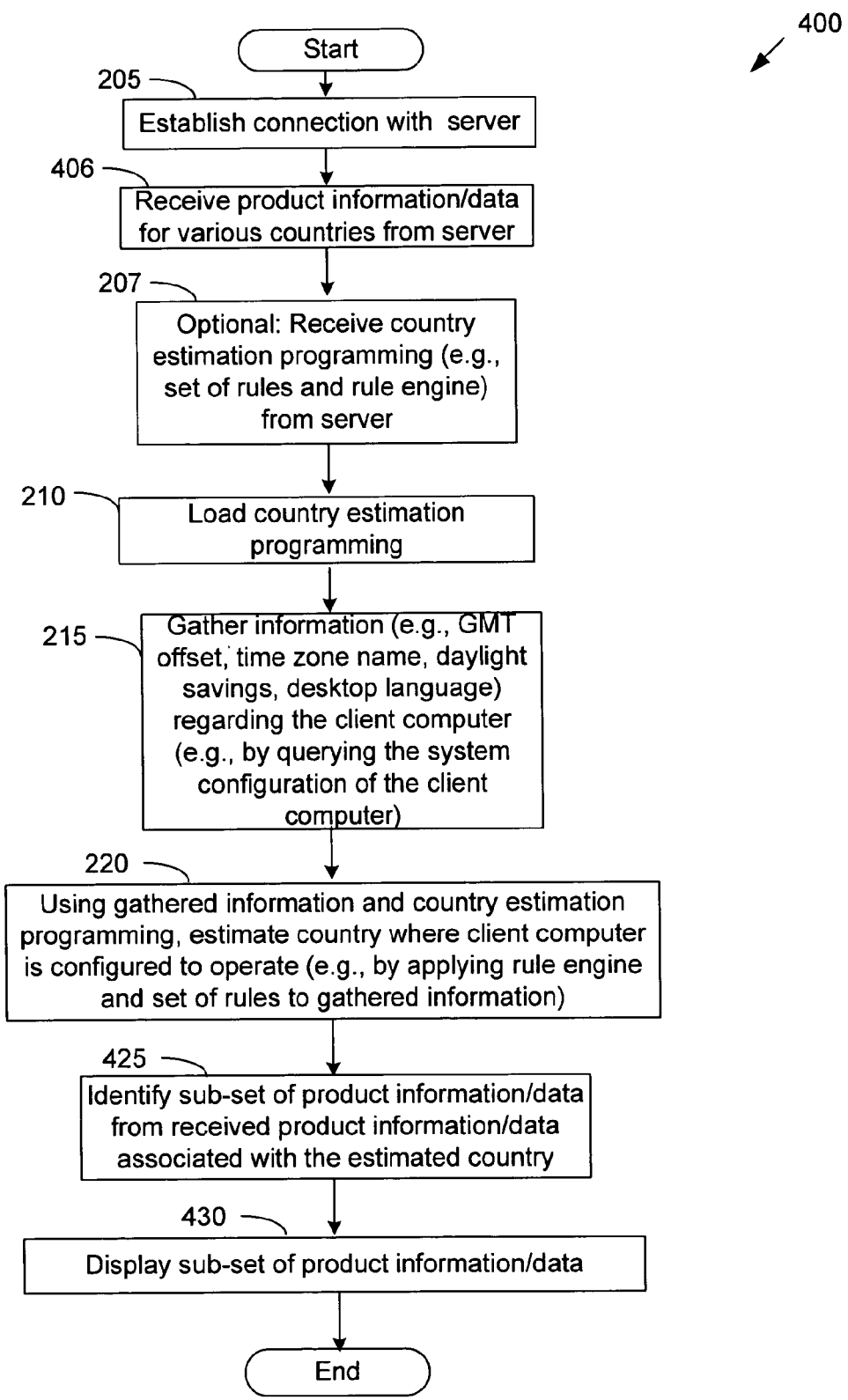
FIG. 4 is a flowchart for an alternative client-side method for automatically estimating the country where a client computer is configured to operate, the estimation being made by the client computer itself.

FIG. 4 is a flowchart for an alternative client-side method 400 for automatically estimating (without human intervention) the country where a client computer is configured to operate, the estimation being made by the client computer itself. The method 400 is similar to the method 200 of FIG. 2 and only those steps that differ are discussed in detail here.

The method 400 begins when it establishes (at 205) a connection with a server. Upon establishing (at 205) the connection with the server, the method then receives (at 406) information (e.g., product information) for two or more various countries from the server. As an optional step, the method receives (at 207) country estimation programming instructions from the server as well. The method then loads (at 210) the country estimation programming instructions and gathers (at 215) configuration information relating to the client computer. Using the gathered configuration information and the country estimation programming instructions, the method then estimates (at 220) the country where the client computer is configured to operate.

The method then identifies (at 425) a sub-set of information/data in the information/data received (at 406) from the server. For example, the identified sub-set of information/data may comprise product information for a product set made available in the estimated country, the product information including the price of products in the product set in the particular currency type of the estimated country. The method displays (at 430) the identified sub-set of information/data and ends.

Set of Rules and Rule Engine

Figure 5:
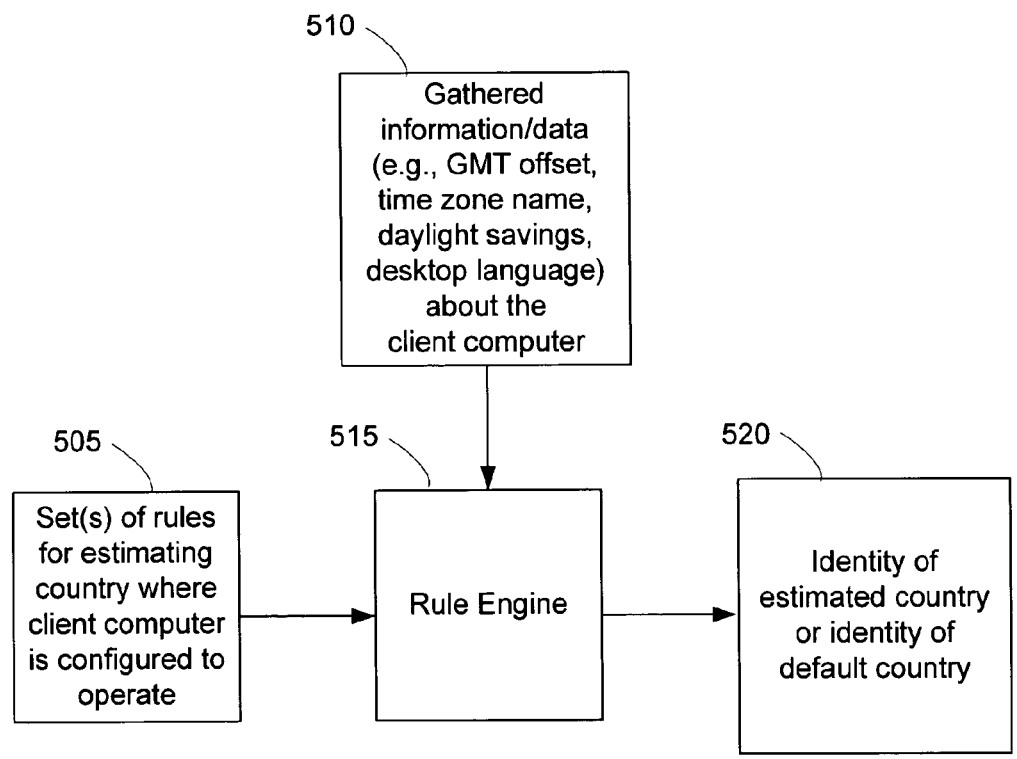
FIG. 5 illustrates a conceptual diagram of the processes of a rule engine.

In some embodiments, the country estimation programming instructions comprises a rule engine implemented by rule programming, the rule engine comprising one or more sets of rules and a processing relationship between the sets of rules and the rules in each set of rules. FIG. 5 illustrates a conceptual diagram of the processes of a rule engine 515. In some embodiments, the processes shown in FIG. 5 comprise step 220 of FIG. 2. As shown in FIG. 5, the rule engine 515 receives as input one or more sets of rules 505 (for estimating the country in which a client computer is configured to operate) and gathered information 510 about the client computer (e.g., country configuration information/settings such as GMT offset, time zone name, daylight savings status, desktop language, etc.). Using these inputs, the rule engine outputs the identity of the estimated country 520.

Typically, the set of rules 505 is configured such that the estimated country 520 is identified from a limited number of countries specified in the set of rules 505. The countries specified in the set of rules 505 are referred to as "supported" countries. In some embodiments, if the gathered information 510 about the client computer indicates a country that is not a supported country, the rule engine 515 may identify a default country (such as the United States) as the country associated with the client computer.

Figure 6:
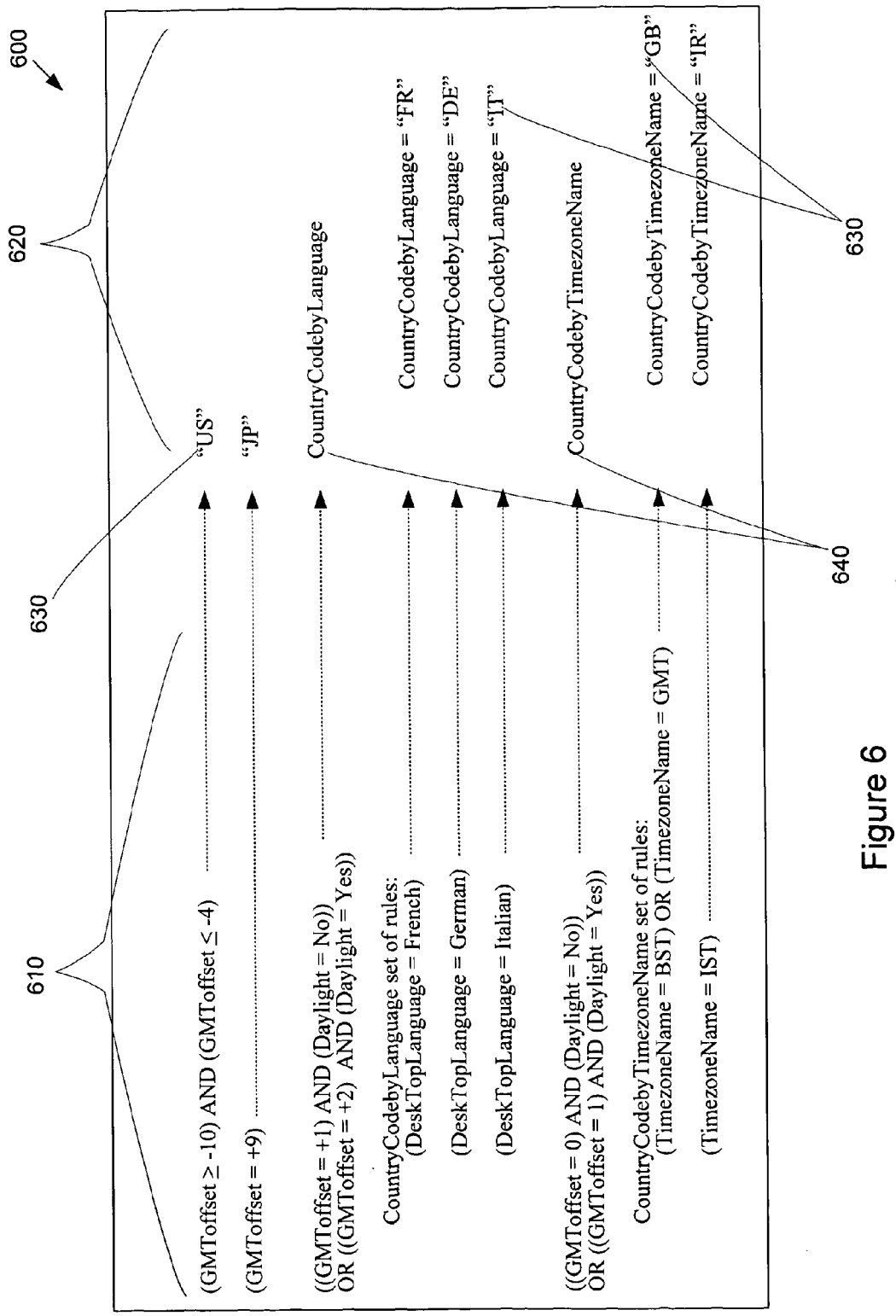
FIG. 6 shows a conceptual example of a sets of rules used for estimating the country associated with a client computer.

FIG. 6 shows a conceptual example of a sets of rules 600 for estimating the country associated with the client computer. In the example of FIG. 6, only seven countries are supported (United States, Japan, France, Germany, Italy, Great Britain, and Ireland), although in other embodiments, any country and any number of countries can be supported.

Each rule in the set of rules 600 comprises an antecedent/qualification (left hand side) 610 and an inference/consequence (right hand side) 620. A rule is processed by the rule engine that examines the antecedent of the rule to determine if the antecedent is true using the gathered information about the client computer. If the antecedent of the rule is true, the inference of the rule is made/determined and examined.

In some embodiments, an inference of a rule comprises another set of rules 640 or a string value 630. For illustrative purposes, in FIG. 6, all string values 630 are shown in between quotation marks where a set of rules 640 are not shown between quotation marks. In some embodiments, a string value comprises characters that uniquely identify a country. In some embodiments, a string value comprises two characters that uniquely identify a country as conventionally used in e-mail or Web addresses (as a two-character component of the e-mail or Web address, such as "US" for the United States, "JP" for Japan, "FR" for France, etc.

If the antecedent of a rule is determined to be true and the inference of the rule contains a set of rules, the set of rules identified in the inference is called for processing by the rule engine. Take for example the following rule: (((GMToffset=+1) AND (Daylight=No)) OR ((GMToffset=+2) AND (Daylight=Yes))---->CountryCodebyLanguage. If the antecedent (((GMToffset=+1) AND (Daylight=No)) OR ((GMToffset=+2) AND (Daylight=Yes))) of the rule is determined to be true, the inference (CountryCodebyLanguage) is made/determined. Since the inference comprises another set of rules (CountryCodebyLanguage) and not a string value, the CountryCodebyLanguage set of rules is called for processing. As shown in the example of FIG. 6, the CountryCodebyLanguage set of rules comprises three rules:

(DeskTopLanguage=French)--->CountryCodebyLanguage="FR"
    (DeskTopLanguage=German)--->CountryCodebyLanguage="DE"
    (DeskTopLanguage=Italian)--->CountryCodebyLanguage="IT"

The rule engine calls and processes rules in a set of rules until an estimated country is identified (i.e., a string value is reached/determined in an inference of a rule) or a default country is identified (where the rule engine determines that the country associated with the client computer is not supported). If, for example, the antecedent for the rule ((DeskTopLanguage=French)--->CountryCodebyLanguage="FR") is found to be true, the inference CountryCodebyLanguage="FR" is made. Since "FR" is a string value (that identifies an estimated country), processing of the set of rules 600 ends.

Figure 7:
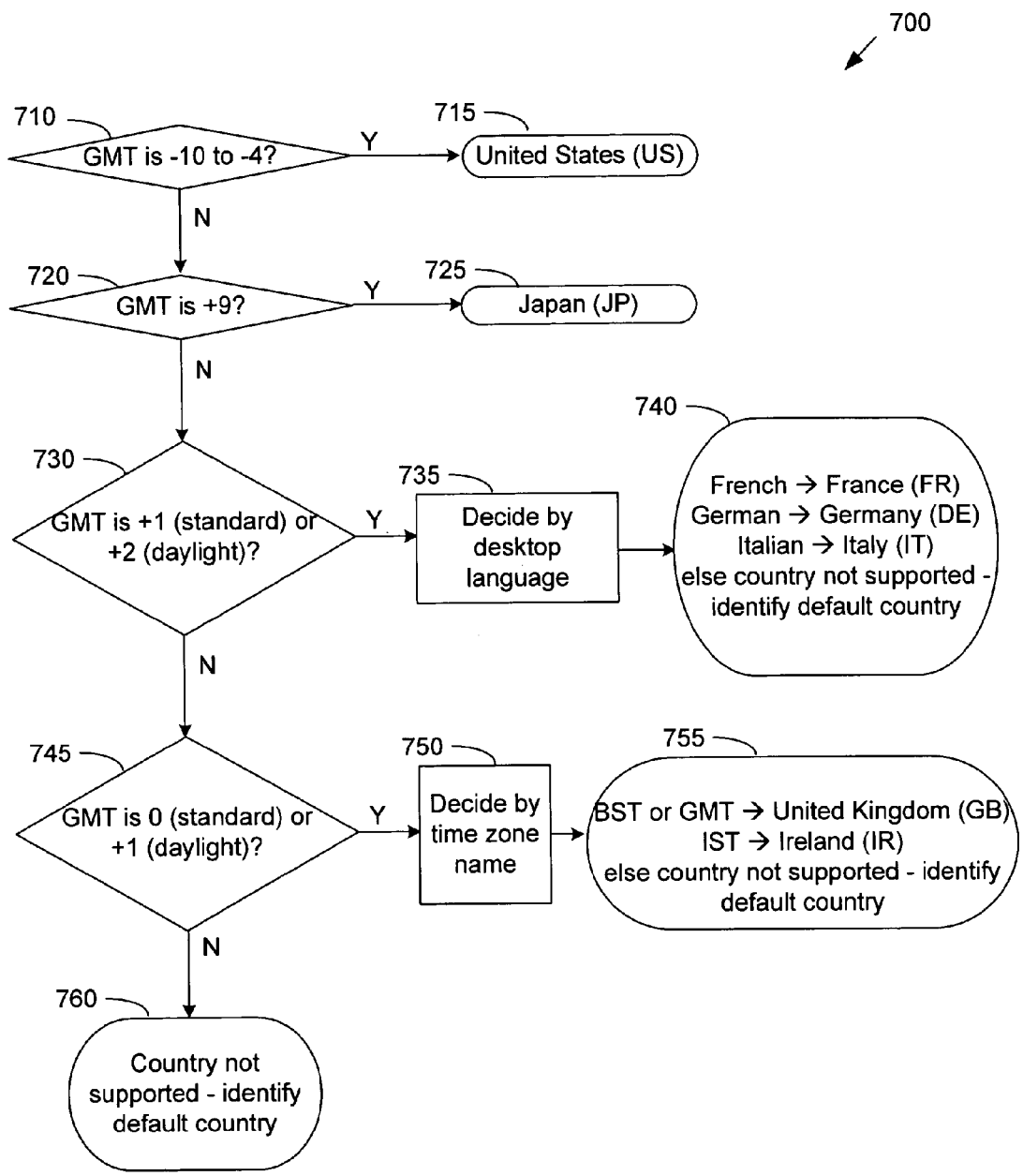
FIG. 7 is a flowchart of a method of the rule engine for processing the set of rules shown in FIG. 6.

FIG. 7 is a flowchart of a method 700 of the rule engine for processing the exemplary set of rules 600 shown in FIG. 6 to estimate a country associated with a client computer. In the following description, the method 700 determines whether an antecedent of a rule is true by using gathered information about the client computer.

The method 700 begins by determining (at 710) whether the antecedent ((GMToffset>−10) AND (GMToffset<−4)) of the first rule in the set of rules is true. If so, the method identifies (at 715) the United States as the estimated country associated with the client computer. In some embodiments, the following antecedent (not shown) is used to determine if the United States is to be identified as the estimated country:

((GMToffset≧−8) AND (GMToffset≦−5) AND (Daylight=No)) OR
    ((GMToffset≧−7) AND (GMToffset≦−4) AND (Daylight=Yes))

If the antecedent is determined (at 710—No) to not be true, the method 700 then determines (at 720) whether the antecedent ((GMToffset=+9)) of the next rule in the set of rules is true. If so, the method identifies (at 725) Japan as the estimated country associated with the client computer. If not, the method 700 then determines (at 730) whether the antecedent (((GMToffset=+1) AND (Daylight=No)) OR ((GMToffset=+2) AND (Daylight=Yes))) of the next rule in the set of rules is true. If so, the method determines (at 735) that the associated country will be determined by the CountryCodebyLanguage set of rules. As such, the method loads and examines (at 740) the CountryCodebyLanguage set of rules. If the antecedent (DeskTopLanguage=French, DeskTopLanguage=German, or DeskTopLanguage=Italian) of any of the rules in the CountryCodebyLanguage set of rules is met, the country (France, Germany, or Italy, respectively) indicated by the inference of the met rule is identified as the estimated country. Otherwise, the method identifies a default country as the estimated country.

If the antecedent is determined (at 730—No) to not be true, the method 700 then determines (at 745) whether the antecedent (((GMToffset=0) AND (Daylight=No)) OR ((GMToffset=1) AND (Daylight=Yes))) of the next rule in the set of rules is true. If so, the method determines (at 750) that the associated country will be determined by the CountryCodebyTimezoneName set of rules. As such, the method loads and examines (at 755) the CountryCodebyTimezoneName set of rules. If the antecedent ((TimezoneName=BST) OR (TimezoneName=GMT) or (TimezoneName=IST)) of any of the rules in the CountryCodebyTimezoneName set of rules is met, the country (Great Britain or Ireland, respectively) indicated by the inference of the met rule is identified as the estimated country. Otherwise, the method identifies a default country as the estimated country.

If the antecedent is determined (at 745—No) to not be true, the method 700 identifies (at 760) a default country as the estimated country.

Rule Engine as a Recursive Program

As described above, the rule engine continues to call and process rules in a set of rules until an estimated country is identified (i.e., a string value is reached/determined in an inference of a rule) or a default country is identified (where a supported country is not identified). As such, the rule engine can be viewed as a recursive rule program that calls upon itself.

Figure 8:
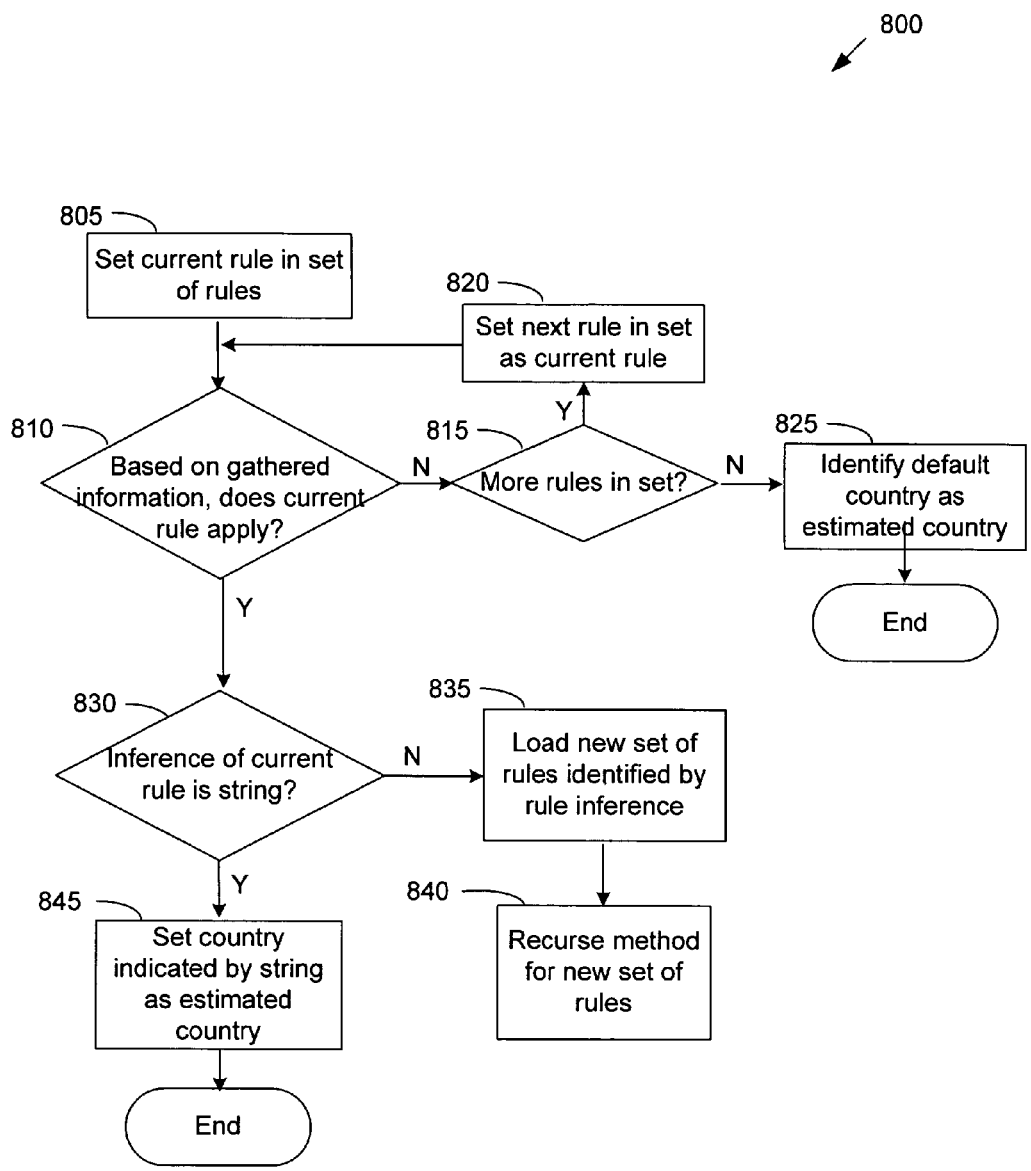
FIG. 8 is a flowchart of the processes of the rule engine as a recursive rule program.

FIG. 8 is a flowchart of the processes of the rule engine as a recursive rule program that processes a set of rules to estimate a country associated with a client computer. In some embodiments, the processes of the rule engine described in relation to FIG. 8 comprise step 220 of FIG. 2.

The method 800 begins by setting (at 805) a current rule in the set of rules. The method 800 determines (at 810) whether the current rule applies (i.e., whether the antecedent/qualification of the current rule is true) by using the gathered information about the computer (e.g., configuration information/data such as GMT offset, time zone name, daylight savings status, desktop language, etc.). If the method determines that the antecedent is not met (at 810—No), the method then determines (at 815) whether there are more rules in the set of rules to process. If so, the method sets (at 820) a next rule in the set as the current rule. If not, the method identifies (at 825) a default country as the estimated country associated with the client computer.

If the method determines that the antecedent of the current rule is met (at 810—Yes), the method then determines (at 830) if the inference of the current rule comprises a string value. If not, this indicates that the inference contains a new set of rules to be processed. As such, the method loads (at 835) the new set of rules (identified in the rule inference) and recurses/calls the method 800 (at 840) to process the new set of rules. For example, if the inference of the current rule is determined to be CountryCodebyLanguage, the method would load (at 835) the CountryCodebyLanguage set of rules and recurse (at 840) the method 800 for the CountryCodebyLanguage set of rules.

If the method determines (at 830—Yes) that the inference of the current rule comprises a string value, this indicates that the identity of the estimated country has been reached. As such, the method sets (at 845) the estimated country as the country indicated by the string value. For example, if the inference is determined to be the string value "JP," the method sets the estimated country as Japan. The method then ends.

Server-Side Estimation of the Country Associated with the Client Computer

Figure 9:
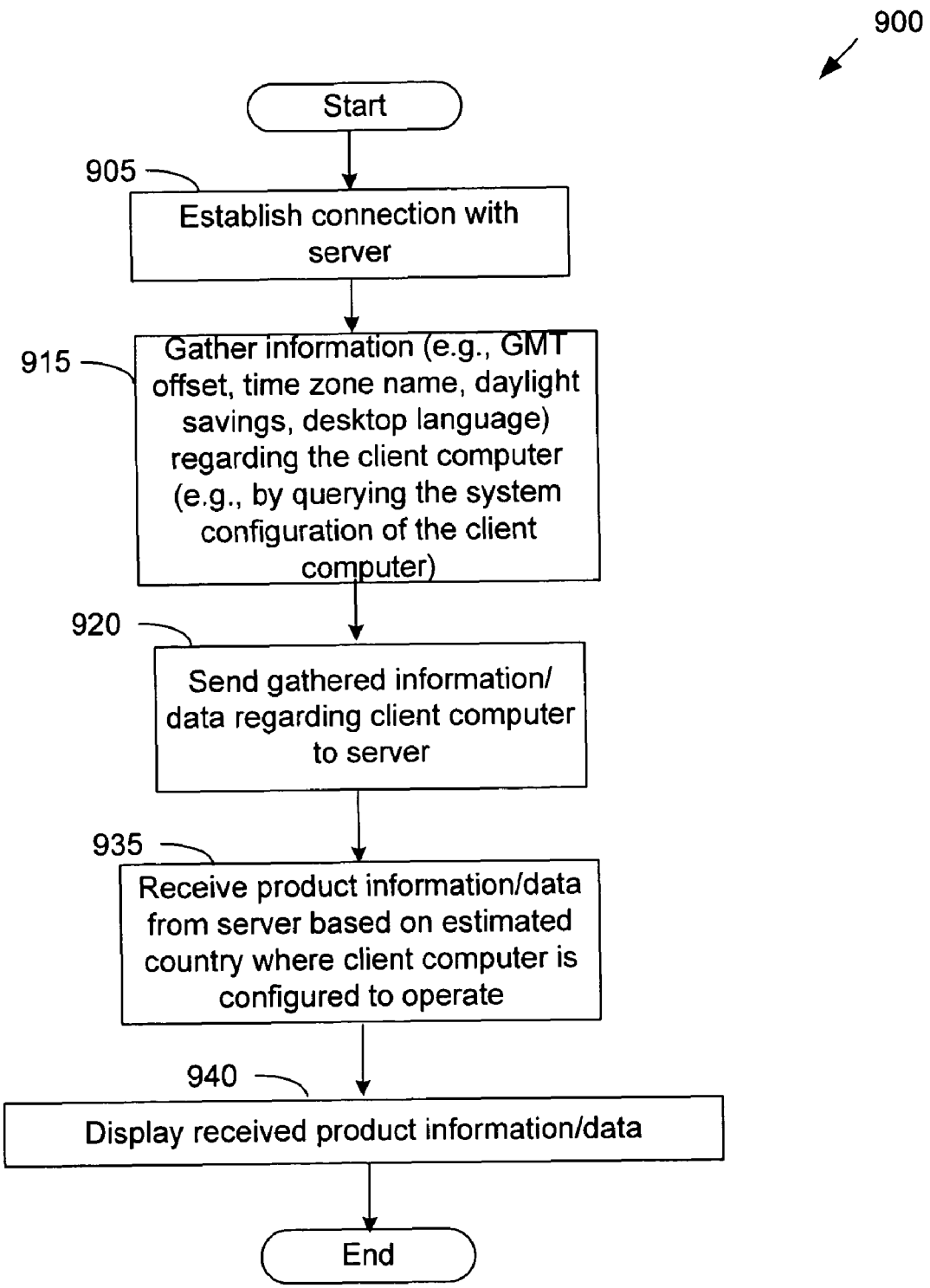
FIG. 9 is a flowchart for another alternative client-side method for automatically estimating the country where a client computer is configured to operate, the estimation being made by a server connected with the client computer.

FIG. 9 is a flowchart for another alternative client-side method 900 for automatically estimating (without human intervention) the country where a client computer is configured to operate, the estimation being made by a server connected with the client computer. The client-side method 900 may be implemented, for example, by a client computer and an application executing on the client computer. In some embodiments, the application is configured to perform the methods of the present invention.

The method 900 begins when it establishes (at 905) a connection (e.g., via a network) with a server. The method then gathers (at 915) configuration information relating to the client computer such as one or more country configuration settings (e.g., GMT offset, time zone name, daylight savings status, desktop language, etc.) of the client computer. This step may be performed, for example, by querying the system configuration of the client computer for the one or more country configuration settings.

The method then sends (at 920) the gathered configuration information to the server. The method then receives (at 935) information/data from the server based on an estimated country where the client computer is configured to operate. The method displays (at 940) the received information/data and ends.

Figure 10:
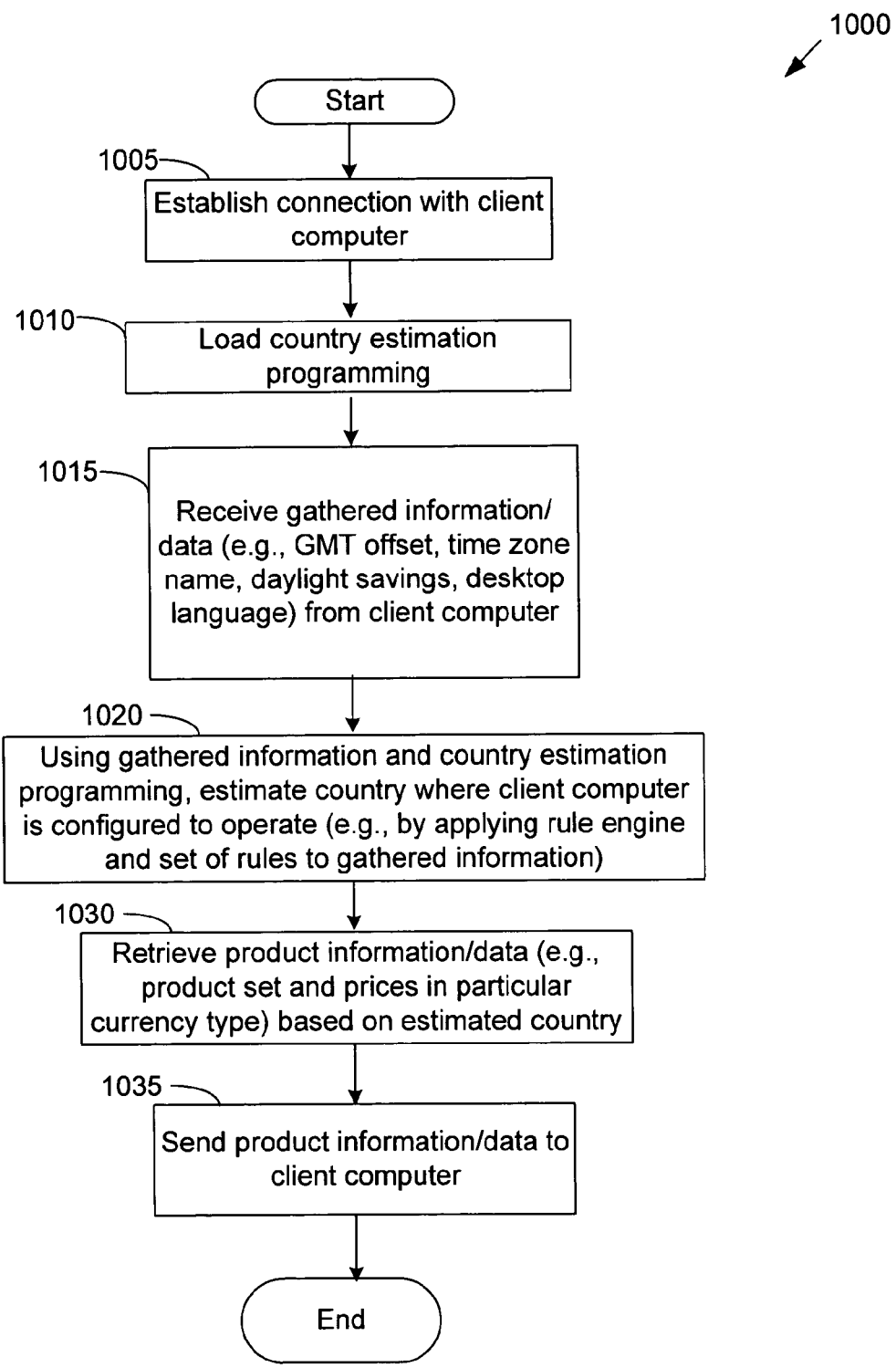
FIG. 10 is a flowchart for an alternative server-side method for automatically estimating the country where a client computer is configured to operate, the estimation being made by a server connected with the client computer.

FIG. 10 is a flowchart for an alternative server-side method 1000 for automatically estimating (without human intervention) the country where a client computer is configured to operate, the estimation being made by a server connected with the client computer. The server-side method 1000 may be implemented, for example, by a server computer connected with the client computer and a client-management application executing on the server computer. In some embodiments, the client-management application is configured to perform the methods of the present invention.

The method 1000 begins when it establishes (at 1005) a connection (e.g., via a network) with the client computer. The method then loads (at 1010) country estimation programming instructions (e.g., from a storage of the server). The method receives (at 1015) gathered configuration information/data regarding the client computer from the client computer. Using the gathered configuration information and the country estimation programming instructions, the method then estimates (at 1020) the country where the client computer is configured to operate.

The method retrieves (at 1030) information/data based on the estimated country (e.g., from a storage of the server). For example, the retrieved information/data may comprise product information for a product set available in the estimated country, the product information including the price of the products in the particular currency type of the estimated country. The method then sends (at 1035) the retrieved information/data to the client computer. The method then ends.

In some embodiments, the country estimation programming instructions comprises a rule engine implemented by rule programming, the rule engine comprising one or more sets of rules and a processing relationship between the sets of rules and the rules in each set of rules. In some embodiments, the rule engine comprises a recursive rule program implemented by rule programming. In some embodiments, the method estimates (at 1020) the country of the client computer by applying the rule engine to the gathered configuration information. In some embodiments, the processes of the rule engine described in relation to FIGS. 5, 6, 7, and 8 comprise step 1020 of the alternative server-side method 1000.

Figure 11:
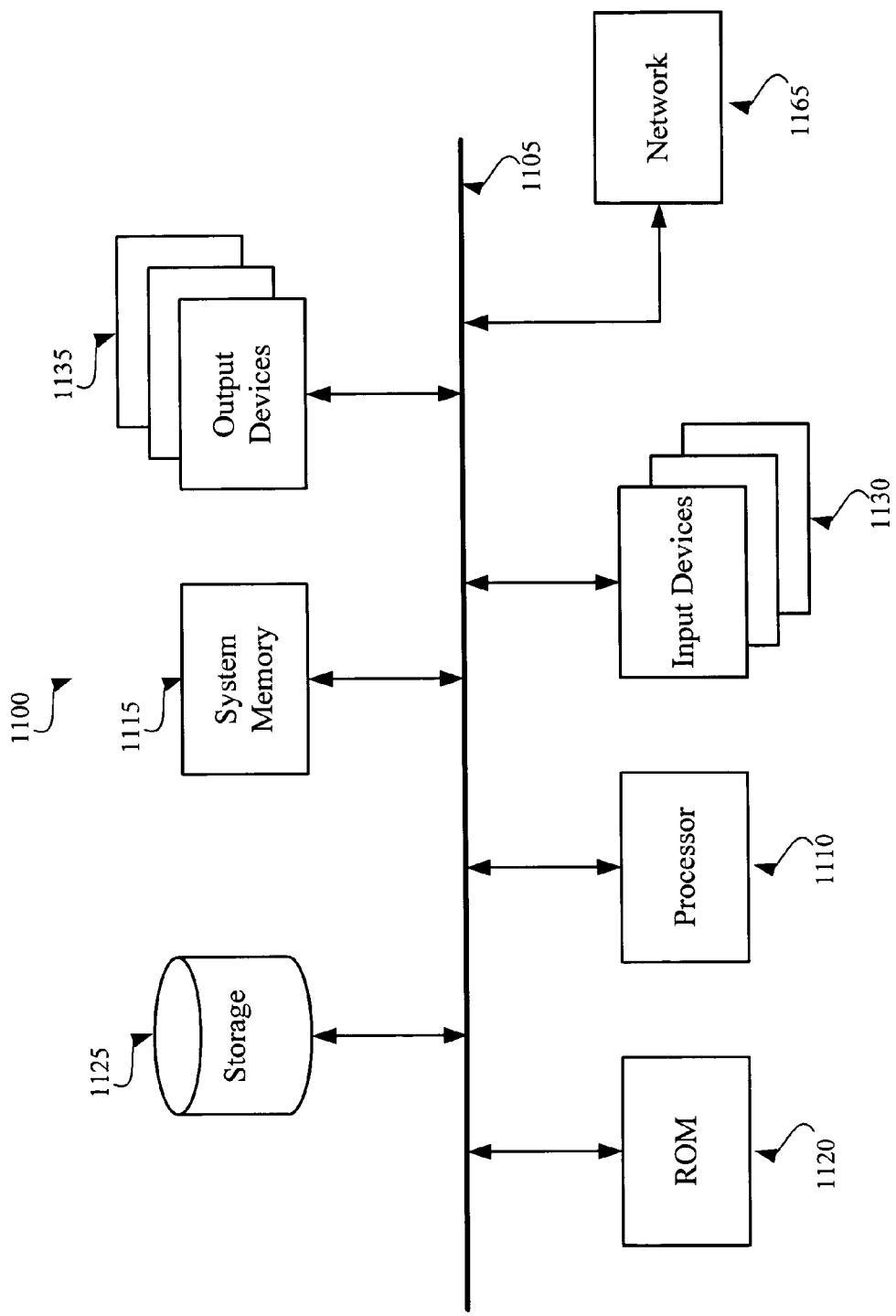
FIG. 11 presents a computer system with which some embodiments of the invention are implemented.

FIG. 11 presents a computer system 1100 with which some embodiments of the invention are implemented. In some embodiments, a client computer and/or server computer comprises the computer system 1100. The computer system 1100 includes a bus 1105, a processor 1110, a system memory 1115, a read-only memory 1120, a permanent storage device 1125, input devices 1130, and output devices 1135.

The bus 1105 collectively represents all system, peripheral, and chipset buses that communicatively connect the numerous internal devices of the computer system 1100. For instance, the bus 1105 communicatively connects the processor 1110 with the read-only memory 1120, the system memory 1115, and the permanent storage device 1125.

The read-only-memory (ROM) 1120 stores static data and instructions that are needed by the processor 1110 and other modules of the computer system. The permanent storage device 1125, on the other hand, is read-and-write memory device. This device is a non-volatile memory unit that stores instruction and data even when the computer system 1100 is off. Some embodiments of the invention use a mass-storage device (such as a magnetic or optical disk and its corresponding disk drive) as the permanent storage device 1125. Other embodiments use a removable storage device (such as a floppy disk or Zip® disk, and its corresponding disk drive) as the permanent storage device.

Like the permanent storage device 1125, the system memory 1115 is a read-and-write memory device. However, unlike storage device 1125, the system memory is a volatile read-and-write memory, such as a random access memory (RAM). The system memory stores some of the instructions and data that the processor needs at runtime.

In some embodiments, instructions and/or data needed to perform methods of the present invention are stored in the system memory 1115, the permanent storage device 1125, the read-only memory 1120, or any combination of the three. For example, the various memory units may contain country estimation programming instructions and/or data relating to product sets and prices of products in the product sets for one or more various countries. From these various memory units, the processor 1110 retrieves instructions to execute and data to process in order to execute the processes of the present invention.

The bus 1105 also connects to the input and output devices 1130 and 1135. The input devices 1130 enable a user to communicate information and select commands to the computer system 1100. The input devices 1130 include alphanumeric keyboards and cursor-controllers. The output devices 1135 display images generated by the computer system 1100. For instance, these devices display may be used to display product information to the user or be used to display a user interface (e.g., graphical user interface) through which the user can interface with the computer system 1100. The output devices include printers and display devices, such as cathode ray tubes (CRT) or liquid crystal displays (LCD).

Finally, as shown in FIG. 11, the bus 1105 also couples the computer system 1100 to a network 1165 through, for example, a network adapter (not shown). In this manner, the computer system 1100 can be a part of a network of computers (such as a local area network ("LAN"), a wide area network ("WAN"), or an Intranet) or a network of networks (such as the Internet). Any or all of the components of the computer system 1100 may be used in conjunction with the present invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A non-transitory computer readable medium storing a computer program for estimating, by a computer server, a country in which a computing device is configured to operate, the computer program executable by a processor, the computer program comprising sets of instructions for:
  receiving system setting information from the computing device that does not expressly identify the country in which the computing device operates;
  using the system setting information to identify a particular country as the country in which the computing device operates; and
  from a set of products associated with a plurality of countries, identifying a subset of products that is associated with the identified particular country by excluding products that are not associated with the particular country from the set of products.

2. The non-transitory computer readable medium of claim 1, wherein the set of products comprises different products that are available in different countries in the plurality of countries, wherein the subset of products comprises all products that are available in the identified particular country from the set of products.

3. The non-transitory computer readable medium of claim 1, wherein the computer program further comprises a set of instructions for sending digital data related to the subset of products associated with the identified particular country to the computing device.

4. The non-transitory computer readable medium of claim 1, wherein the system setting information comprises at least one of Greenwich Mean Time offset, time zone name, daylight savings status, and desktop language settings.

5. The non-transitory computer readable medium of claim 1, wherein the computer program further comprises a set of instructions for identifying, from a set of data formats associated with the plurality of countries, a subset of data formats that is associated with the identified particular country by excluding data formats that are not associated with the particular country from the set of data formats.

6. The non-transitory computer readable medium of claim 5, wherein the set of data formats comprises a plurality of currency types associated with the plurality of countries, wherein the subset of data formats comprises a currency type associated with the particular country.

7. A method performed by a set of servers for estimating a country where a client computing device is configured to operate, the method comprising:
  sending to the client computing device a set of country estimation programming instructions for the client computing device to automatically estimate the country in which the client computing device is configured to operate;
  receiving, from the client computing device, information indicating the estimated country, the information indicating the estimated country derived by the client computing device by applying the country estimation programming instructions to a plurality of configuration settings of the client computing device;
  identifying, from a set of products associated with a plurality of countries, a subset of products that is associated with the estimated country by excluding products that are not associated with the estimated country from the set of products; and
  sending, to the client computing device, digital data related to the subset of products that the set of servers identified as associated with the estimated country.

8. The method of claim 7 further comprising sending a plurality of rules for estimating the country to the client computing device, wherein at least one rule in the plurality of rules comprises an antecedent and an inference, wherein the inference is determined if the antecedent is determined to be true, wherein the country estimation programming instructions comprise a rule engine that processes the plurality of rules to estimate the country.

9. The method of claim 8, wherein at least one inference identifies the estimated country.

10. A non-transitory computer readable medium storing a computer program for estimating, by a client computing device, a country in which the computing device is configured to operate, the computer program executable by a processor, the computer program comprising sets of instructions for:
  gathering a set of system settings that does not expressly identify a country in which the client computing device operates;
  sending the gathered set of system settings to a server in order to allow the server to use country estimation programming instructions to estimate a particular country as the country in which the client computing device operates;
  receiving, from the server, digital data related to a group of products that the server automatically identifies as associated with the particular country by applying the server's automatic estimation of the particular country to the set of system settings, wherein the group of products is selected by excluding products that are not associated with the particular country from a set of products that are associated with a plurality of countries; and
  displaying, on an electronic display device, the digital data related to the group of products.

11. The non-transitory computer readable medium of claim 10, wherein the computer program further comprises a set of instructions for receiving, from the server, information indicating a group of data formats that the server automatically identifies as associated with the particular country by applying the server's automatic estimation of the particular country to the set of system settings, wherein the group of data formats is selected by excluding data formats that are not associated with the particular country from a set of data formats that are associated with a plurality of countries.

12. The non-transitory computer readable medium of claim 11, wherein the set of data formats comprises a plurality of currency types associated with the plurality of countries, wherein the group of data formats comprises a currency type associated with the particular country.

13. A method performed by a client computing device for estimating a country where the client computing device is configured to operate, the method comprising:
  receiving, from a server, country estimation programming for automatically estimating a particular country as the country in which the client computing device operates based on a set of configuration settings;
  gathering the set of configuration settings of the client computing device;
  estimating the particular country as the country in which the client computing device operates by applying the received country estimation programming to the gathered set of configuration settings;

sending country information indicating the particular country as the country in which the client computing device operates to the server;

receiving, from the server, digital data related to a group of products that the server automatically identifies as associated with the particular country, wherein the group of products is selected by excluding products that are not associated with the particular country from a set of products that are associated with a plurality of countries; and displaying, on an electronic display device, the digital data related to the group of products.

14. The method of claim 13 further comprising receiving, at the client computing device, a plurality of rules for estimating the particular country from the server, wherein at least one rule in the plurality of rules comprises an antecedent and an inference, wherein the inference is determined if the antecedent is determined to be true, wherein the country estimation programming comprises a rule engine that processes the plurality of rules to estimate the particular country.

15. The method of claim 14, wherein at least one inference identifies the particular country.

16. A method performed by a set of servers for estimating a country in which a computing device operates, the method comprising:

receiving, from the computing device, system setting information of the computing device that does not expressly identify the country in which the computing device operates;

using the system setting information to identify a particular country as the country in which the computing device operates; and identifying, from a set of data associated with a plurality of countries, a subset of data that is associated with the identified particular country by excluding data that is not associated with the particular country from the set of data.

17. The method of claim 16, wherein the set of data comprises different products that are available in different countries in the plurality of countries, wherein the subset of data comprises only products that are available in the identified particular country.

18. The method of claim 16 further comprising sending, from the server to the computing device, digital data related to the subset of data associated with the identified particular country.

19. The method of claim 16, wherein the set of data comprises a set of data formats that are associated with different countries in the plurality of countries, wherein the subset of data comprises only data formats that are available in the identified particular country.

20. The method of claim 19, wherein the set of data formats comprises different measurement units, wherein the different measurement units comprise inch and centimeter.

* * * * *